United States Patent
Nara et al.

(10) Patent No.: US 10,693,172 B2
(45) Date of Patent: Jun. 23, 2020

(54) MANUFACTURING METHOD OF FUEL CELL STACK

(71) Applicant: HONDA MOTOR CO., LTD., Tokyo (JP)

(72) Inventors: Yusuke Nara, Wako (JP); Kosuke Takagi, Wako (JP); Yoshihito Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 397 days.

(21) Appl. No.: 15/609,017

(22) Filed: May 31, 2017

(65) Prior Publication Data
US 2017/0346126 A1 Nov. 30, 2017

(30) Foreign Application Priority Data
May 31, 2016 (JP) .................................. 2016-108155

(51) Int. Cl.
*H01M 8/247* (2016.01)
*H01M 8/2404* (2016.01)
(Continued)

(52) U.S. Cl.
CPC .......... *H01M 8/2404* (2016.02); *H01M 2/08* (2013.01); *H01M 8/0271* (2013.01);
(Continued)

(58) Field of Classification Search
CPC ...... H01M 8/2404; H01M 8/247; H01M 2/08; H01M 8/0271; H01M 8/0297; H01M 8/10;
(Continued)

(56) References Cited

U.S. PATENT DOCUMENTS

| 5,514,486 | A | * | 5/1996 | Wilson | .............. | H01M 8/04291 |
| | | | | | | 429/457 |
| 5,716,503 | A | * | 2/1998 | Dean | ......................... | C25B 9/18 |
| | | | | | | 204/270 |
| 2013/0202983 | A1 | * | 8/2013 | Nishiyama | ............ | H01M 8/248 |
| | | | | | | 429/465 |

FOREIGN PATENT DOCUMENTS

| JP | 01320777 A | * 12/1989 | ............. H01B 8/247 |
| JP | 2009252703 A | * 10/2009 | |

(Continued)

OTHER PUBLICATIONS

English translation of JP 2009-252703 (Year: 2009).*
English translation of JPH01-320777 (Year: 1989).*

*Primary Examiner* — Milton I Cano
*Assistant Examiner* — Philip A. Stuckey
(74) *Attorney, Agent, or Firm* — Mori & Ward, LLP

(57) ABSTRACT

A manufacturing method includes providing a cell stack including fuel cells and has a first end and a second end. A first end plate is provided at the first end of the cell stack. The first end plate has a first end plate through hole. A second end plate is provided at the second end of the cell stack. A connecting member is provided to connect the first end plate and the second end plate. A first knock is inserted into the first end plate through hole and into a first connecting member installing hole. A first seal is located between the first knock and the first end plate in the first end plate through hole. The first end plate is moved in the stacking direction to contact the connecting member. A fastening member is inserted into the first knock.

7 Claims, 16 Drawing Sheets

(51) Int. Cl.
*H01M 2/08* (2006.01)
*H01M 8/0271* (2016.01)
*H01M 8/0297* (2016.01)
*H01M 8/10* (2016.01)
*H01M 8/2475* (2016.01)
*H01M 8/1018* (2016.01)

(52) U.S. Cl.
CPC ............ *H01M 8/0297* (2013.01); *H01M 8/10* (2013.01); *H01M 8/247* (2013.01); *H01M 8/2475* (2013.01); *H01M 2008/1095* (2013.01); *Y02P 70/56* (2015.11)

(58) Field of Classification Search
CPC ......... H01M 8/2475; H01M 2008/1095; Y02P 70/56
See application file for complete search history.

(56) References Cited

FOREIGN PATENT DOCUMENTS

| | | |
|---|---|---|
| JP | 2013-179032 | 9/2013 |
| JP | 2014-216269 | 11/2014 |

\* cited by examiner

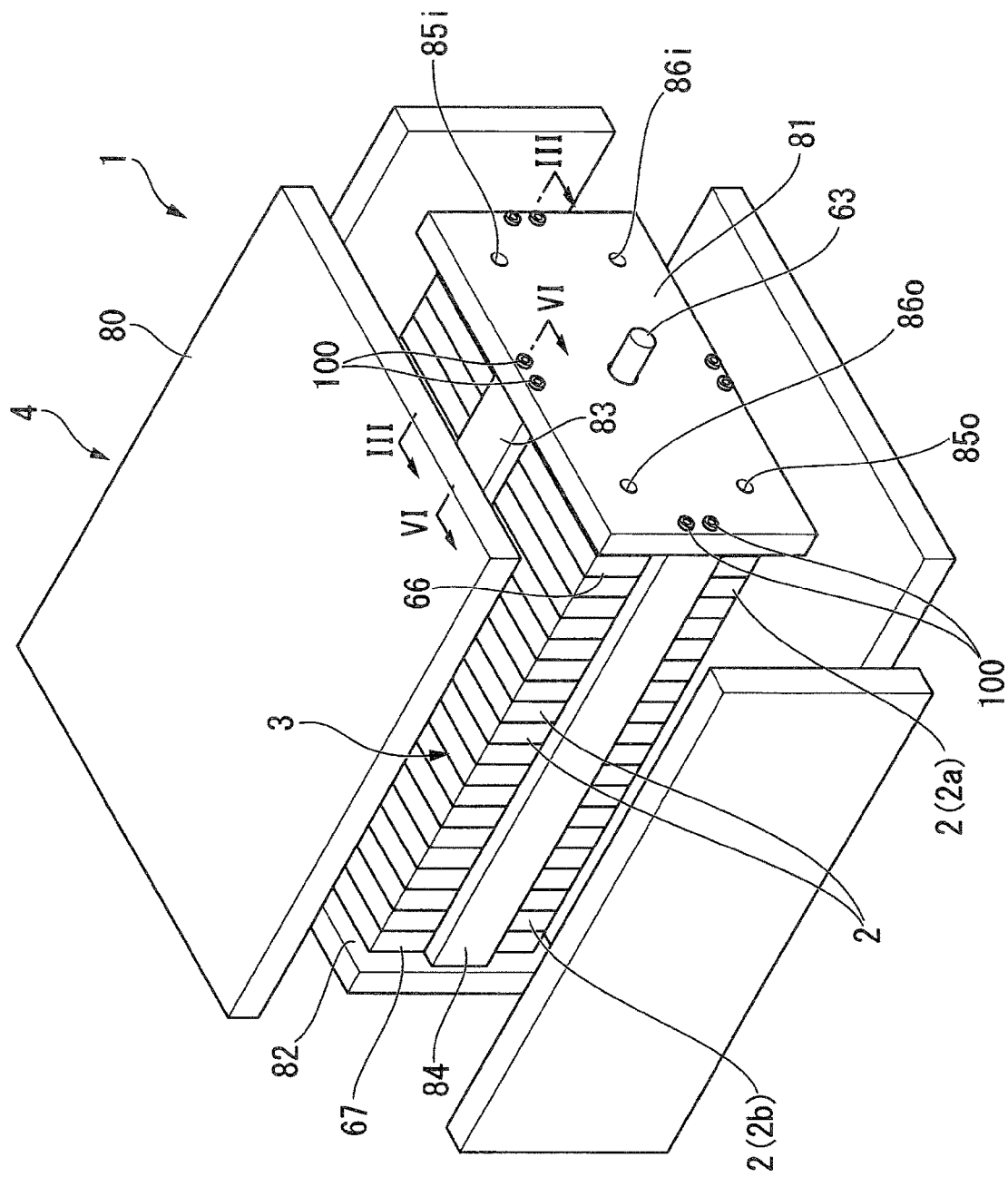
Fig 1
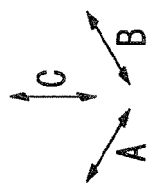

MANUFACTURING METHOD OF FUEL CELL STACK

CROSS-REFERENCE TO RELATED APPLICATIONS

The present application claims priority under 35 U.S.C. § 119 to Japanese Patent Application No. 2016-108155 filed May 31, 2016. The contents of this applications are incorporated herein by reference in their entirety.

BACKGROUND OF THE INVENTION

Field of the Invention

The present relates to a manufacturing method of a fuel cell stack.

Discussion of the Background

A fuel cell stack mounted on a vehicle, etc. is provided with a cell stack and a casing for housing the cell stack (see, for example, Japanese Published Unexamined Application No. 2014-216269).

The cell stack is composed of a plurality of stacked unit cells. The unit cell is provided with a membrane electrode assembly (MEA) formed by holding a solid polyelectrolyte membrane between an anode electrode and a cathode electrode and a separator for holding the membrane electrode assembly.

The casing has a pair of end plates for holding the cell stack from both sides of the stacked direction, a connecting bar used as a bridge between the pair of end plates, and a side panel for surrounding the periphery of the cell stack from the direction perpendicular to the stacking direction.

The end plates and the connecting bar are fastened by a fastening member inserted into an end plate installing hole and a connecting bar installing hole in a condition in which the end plates is caused to abut against the connecting bar in the stacking direction of the cell stack. For example, disclosed in Japanese Published Unexamined Application No. 2013-179032 is a structure in which a cylindrical knock is disposed into the end plate installing hole and the connecting bar installing hole. The cylindrical knock is located to straddle the end plate installing hole and the connecting bar installing hole and located around the fastening member.

In the fuel cell stack stated above, hydrogen gas is supplied to the anode electrode as fuel gas and air is supplied to the cathode electrode as oxidant gas. With this, hydrogen ions generated by catalytic reaction at the anode electrode permeate the solid polyelectrolyte membrane and move to the cathode electrode, where the hydrogen ions undergo an electrochemical reaction with oxygen in the air to generate electricity.

SUMMARY

According to one aspect of the present invention a manufacturing method of a fuel cell stack includes a stacking step for locating a first endplate and a second endplate on both sides of a cell stack in a first direction, the cell stack being formed by stacking a plurality of fuel cells in the first direction. A connecting member is located between the first end plate and the second end plate in a connecting member locating step. A cylindrical knock is inserted to extend between an end plate installing hole of at least one of the first end plate and the second end plate and a connecting member installing hole of the connecting member in a knock inserting step. The first and second end plates are moved closer to each other in the first direction to allow the one of the end plates to be abutted against the connecting member in the first direction in a seating step. The one of the end plates and the connecting member are fastened in the first direction by inserting a fastening member into the cylindrical knock in a fastening step for fastening. In the knock inserting step, a first seal member is inserted around one end portion of the cylindrical knock in its axial direction, while a second seal member is inserted around another end portion of the cylindrical knock in its axial direction, and wherein the cylindrical knock is located in such a manner that the first seal member is located within the end plate installing hole, while the second seal member is located within the connecting member installing hole.

According to another aspect of the present invention a manufacturing method of a fuel cell stack including a cell stack, includes providing the cell stack including fuel cells stacked in a stacking direction and having a first end and a second end opposite to the first end in the stacking direction. A first end plate is provided at the first end of the cell stack. The first end plate has a first endplate through hole. A second endplate is provided at the second end of the cell stack. A connecting member is provided to connect the first end plate and the second end plate such that first end plate through hole is aligned with a first connecting member installing hole in the connecting member. A first knock with a first seal and a second seal provided around an outer surface of the first knock is inserted into the first end plate through hole and into the first connecting member installing hole. The first seal is located between the first knock and the first end plate in the first end plate through hole. The second seal is located between the first knock and the connecting member in the first connecting member installing hole. The first end plate or the connecting member is moved in the stacking direction to contact each other. A fastening member is inserted into the first knock to connect the first the end plate to the connecting member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is an exploded perspective view a fuel cell stack of a preferred embodiment as seen from the side of a first end plate;

DESCRIPTION OF THE EMBODIMENTS

Figure 2:
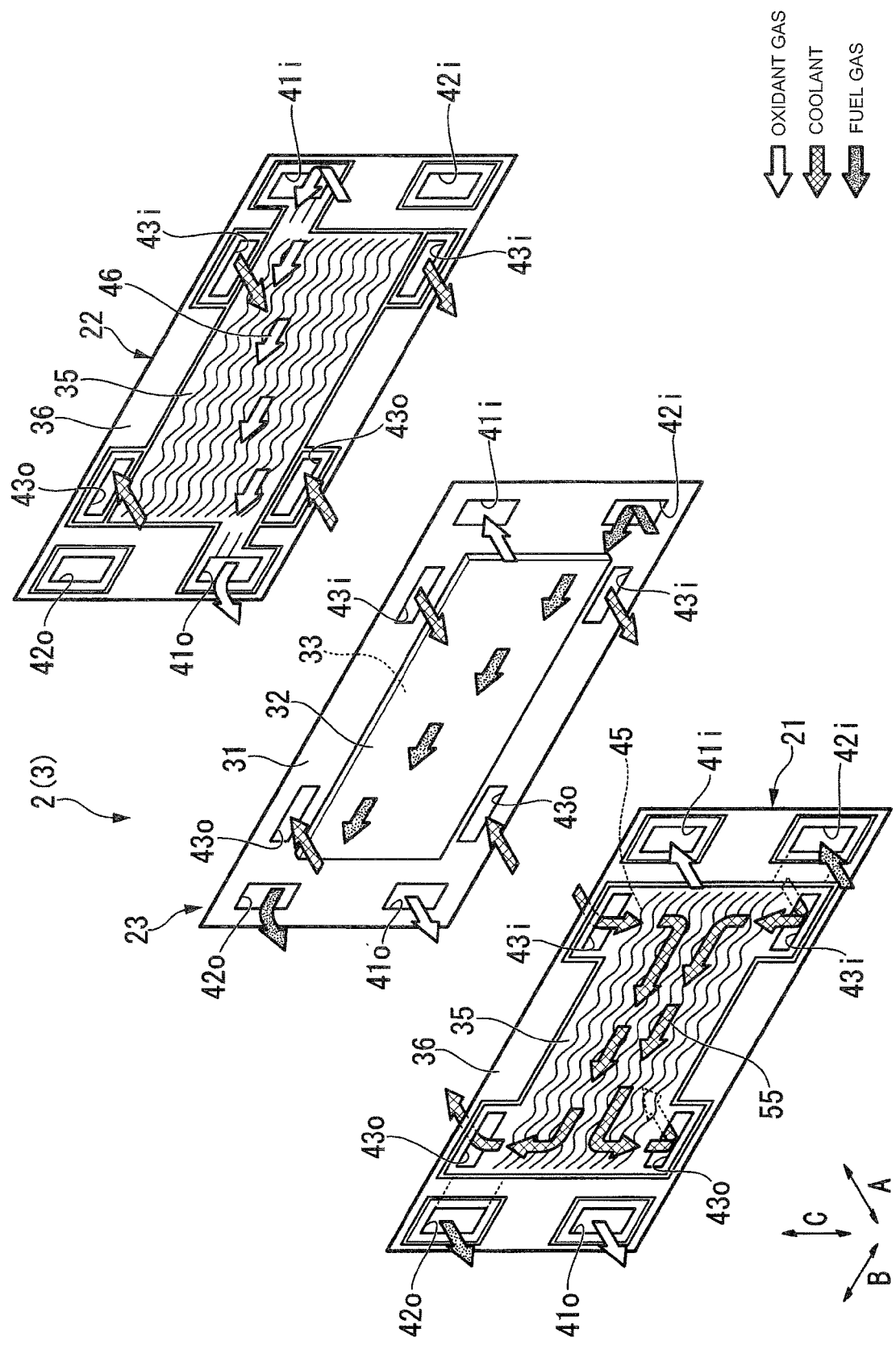
FIG. 2 is an exploded perspective view of a unit cell as shown in FIG. 1.

The embodiments will now be described with reference to the accompanying drawings, wherein like reference numerals designate corresponding or identical elements throughout the various drawings.

Next, a preferred embodiment of the present invention will now be described with reference to the accompanying drawings.

[Fuel Cell Stack]

FIG. 1 is an exploded perspective view of a fuel cell stack 1 of the present embodiment as seen from the side of a first end plate 81.

As shown in FIG. 1, a fuel cell stack 1 of the present embodiment is mounted under a motor room or a floor defined at the front part of a vehicle (not shown). The fuel cell stack 1 is used to provide power to, for example, a drive motor. It is to be noted that the fuel cell stack 1 of the present embodiment is mounted on the vehicle in such a manner that a direction of an arrow mark A (a first direction) in the figure is a width direction of the vehicle, the direction of an arrow B is a front-back direction thereof, and the direction of an arrow C is a vertical direction thereof.

The fuel cell stack 1 is mainly provided with a cell stack 3 and a casing 4 for housing the cell stack 3.

The cell stack 3 is formed by stacking a plurality of unit cells (fuel cells) 2 in the direction of an arrow A. In the directions A, B, and C, a direction moving toward a central part of the fuel stack 3 may be hereinafter referred to an inside, while a direction moving away from the central part of the fuel stack 3 may be hereinafter referred to an outside.

<Unit Cell>

FIG. 2 is an exploded perspective view of a unit cell 2.

As shown in FIG. 2, the unit cell 2 is, for example, provided with a pair of separators 21, 22 and a membrane electrode assembly 23 (hereinafter simply referred to as MEA 23) held between each separator 21, 22. The MEA 23 is provided with a solid polyelectrolyte membrane 31 and an anode electrode 32 and a cathode electrode 33 for holding the solid polyelectrolyte membrane 31 from both sides of the direction of an arrow A.

The anode electrode 32 and the cathode electrode 33 have a gas diffusion layer composed of carbon paper, etc. and an electrode catalyst layer formed by uniformly applying porous carbon particles on which a platinum alloy is carried on the surface of the gas diffusion layer.

The solid polyelectrolyte membrane 31 is formed by a material in which, for example, perfluorosulphonic acid polymer is impregnated with water. The solid polyelectrolyte membrane 31 is provided in such a manner that its external shape in the front view as seen from an A-direction is larger than the anode electrode 32 and the cathode electrode 33. In an example of FIG. 2, the anode electrode 32 and the cathode electrode 33 are overlapped in the central part of the solid polyelectrolyte membrane 31. An outer peripheral part of the solid polyelectrolyte membrane 31 protrudes in the shape of a picture frame relative to the anode electrode 32 and the cathode electrode 33.

Each separator 21, 22 of the unit cell 2 is a first separator 21 disposed on the side of the anode electrode 32 of the MEA 23 and a second separator 22 disposed on the side of the cathode electrode 33 of the MEA 23. In the following description, it is to be noted that, in each separator 21, 22, similar reference numeral is given to the same configuration for collective description.

Each separator 21, 22 has a separator plate 35 and a covering member 36 adapted to cover the outer peripheral portion of the separator plate 35.

The separator plate 35 is composed of a rectangular metal or carbon plate of which the longitudinal direction is a direction of an arrow B. In an example of FIG. 2, the separator plate 35 is formed in such a manner that its external shape in the front view is commensurate with that of the solid polyelectrolyte membrane 31. The separator plate 35 is located to overlap the MEA 23 as seen from a A-direction.

Figure 3:
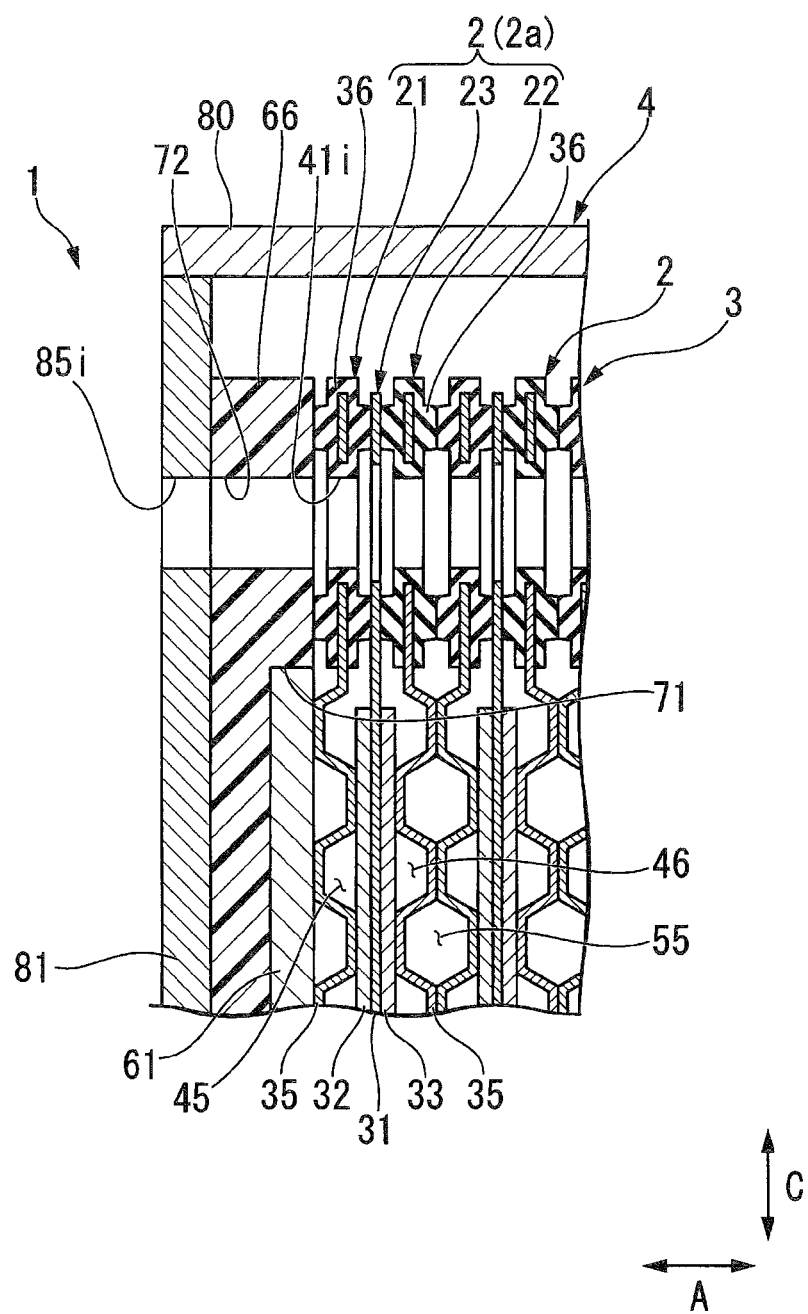
FIG. 3 is a cross-sectional view taken along lines III-III of FIG. 1.

FIG. 3 is a cross-sectional view taken along lines III-III of FIG. 1.

As shown in FIG. 3, the covering member 36 is made of an elastically deformable material such as rubber. The covering member 36 is closely contacted on the outer peripheral part of the solid polyelectrolyte membrane 31 in the A-direction.

As shown in FIG. 2, each corner section of the unit cell 2 is provided with an entrance side gas communicating hole (an oxidant gas inlet communicating hole 41$i$ and a fuel gas inlet communicating hole 42$i$) and an exit side gas communicating hole (an oxidant gas outlet communicating hole 41$o$ and a fuel gas outlet communicating hole 42$o$). Each communicating hole 41$i$, 41$o$, 42$i$, and 42$o$ penetrates through the unit cell 2 in the A-direction. In an example shown in FIG. 2, formed on an upper right corner section of the unit cell 2 is an oxidant gas inlet communicating hole 41$i$ for supplying the oxidant gas (e.g., air etc.). Formed on the lower right corner section of the unit cell 2 is a fuel gas inlet communicating hole 42$i$ for supplying fuel gas (e.g., hydrogen etc.). Also, formed on the lower left corner section of the unit cell 2 is an oxidant gas outlet communicating hole 41$o$ for discharging used oxidant gas. The fuel gas outlet communicating hole 42$o$ for discharging used fuel gas is formed on the upper left corner section of the unit cell 2.

In the unit cell 2, a coolant inlet communicating hole 43$i$ is respectively formed on the sections situated on the inside of each inlet communicating hole 41$i$, 42$i$ in the B-direction.

In the unit cell 2, a coolant outlet communicating hole 43$o$ is respectively formed on the sections situated on the inside of each outlet communicating hole 41$o$, 42$o$ in the B-direction. It is to be noted that a pair of coolant inlet communicating holes 43$i$ and a pair of coolant outlet communicating holes 43$o$ are respectively located in a position facing each other in the C-direction while holding the anode electrode 32 and the cathode electrode 33 therebetween.

Each separator 21, 22 (separator plate 35) is provided in the central part thereof to have an uneven shape formed by press forming and the like. Each surface of the separators 21, 22 facing the MEA 23 is respectively provided with a gas flow channel 45, 46 between the separator and the MEA 23.

Specifically, a fuel gas flow channel 45 is formed between the surface of a first separator 21 facing the anode electrode 32 and the anode electrode 32 of the MEA 23. The fuel gas channel 45 is provided to respectively communicate with the fuel gas inlet communicating hole 42i and the fuel gas outlet communicating hole 42o.

An oxidant gas flow channel 46 is formed between the surface of a second separator 22 facing the cathode electrode 33 and the cathode electrode 33 of the MEA 23. The oxidant gas flow channel 46 is provided to respectively communicate with the oxidant gas inlet communicating hole 41i and the oxidant gas outlet communicating hole 41o.

As shown in FIG. 3, the cell stack 3 is formed by stacking the first separator 21 of one unit cell 2 and the second separator 22 of another unit cell 2 adjacent to one unit cell 2 in the A-direction, in such a condition that the first separator and the second separator are caused to overlap each other. A coolant flow channel 55 is formed between the first separator 21 of one unit cell 2 and the second separator 22 of another unit cell 2. As shown in FIG. 2, the coolant flow channel 55 is adapted to respectively communicate with the coolant inlet communicating hole 43i and the coolant outlet communicating hole 43o. It is to be noted that for example, pure water, ethylene glycol and the like are preferably used as a coolant flowing through the coolant flow channel 55.

The stacking structure of the unit cell 2 is not limited to the above-mentioned structures. For example, the unit cell may be composed by three separators and two MEAs held between each separator. The layout of each communicating hole may also be suitably changed.

As shown in FIG. 3, a first terminal plate 61 is allocated to one side of the cell stack 3 in the A-direction. The external shape of the first terminal plate 61 in the front view is smaller than the separator 21, 22. The first terminal plate 61 is electrically connected through the first separator 21 to the anode electrode 32 of the unit cell (hereinafter referred to as a first end cell 2a) situated on one side of the cell stack 3 (each unit cell 2) in the A-direction. The first terminal plate 61 is provided with an output terminal 63 (see FIG. 1) which protrudes toward the outside of the A-direction.

Allocated on the outside of the first terminal plate 61 in the A-direction is a first insulator 66. The outer shape of the first insulator 66 in the front view is made larger than the first terminal plate 61. Also, the first insulator 66 is made thicker than the first terminal plate 61 in the A-direction.

The first insulator 66 is provided in the center with a housing portion 71 which has a depression toward the outside of the A-direction. Housed within the housing portion 71 is the first terminal plate 61 stated above. The outer peripheral portion (a portion situated outside the housing portion 71) of the first insulator 66 is in close contact with the first separator 21 (the covering member 36) in the first end cell 2a from the outside of the A-direction. The first insulator 66 is provided on its outer peripheral portion with an oxidant gas inlet connecting hole 72 and a fuel gas inlet connecting hole (not shown) adapted to communicate respectively with each gas inlet communicating hole 41i, 42i stated above. Further, the first insulator 66 is provided on its peripheral portion with an oxidant gas outlet connecting hole and a fuel gas outlet connecting hole (not shown) adapted to communicate respectively with each gas outlet communicating hole 41o, 42o stated above.

Figure 4:
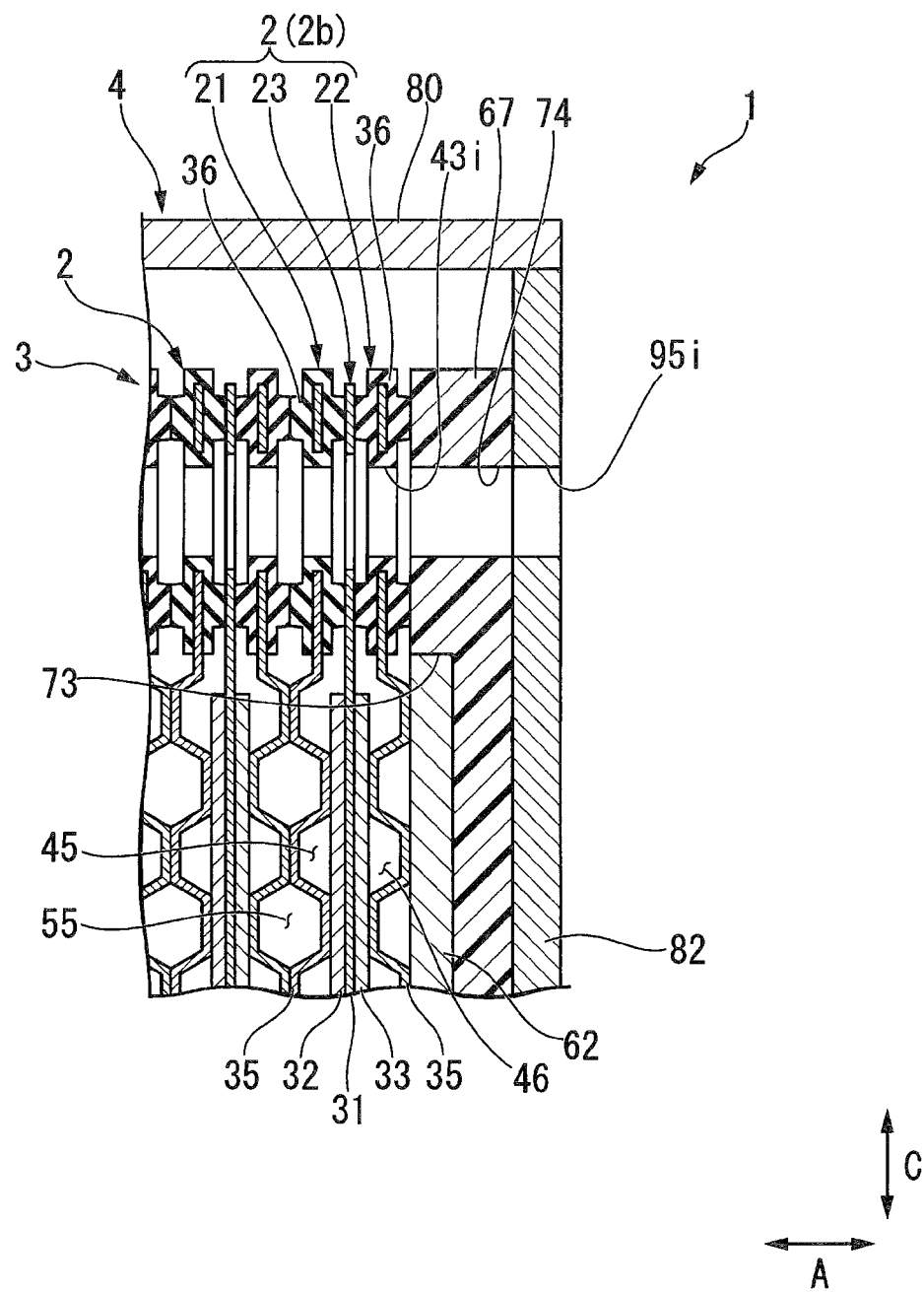
FIG. 4 is a cross-sectional view taken along lines IV-IV of FIG. 5.
Figure 5:
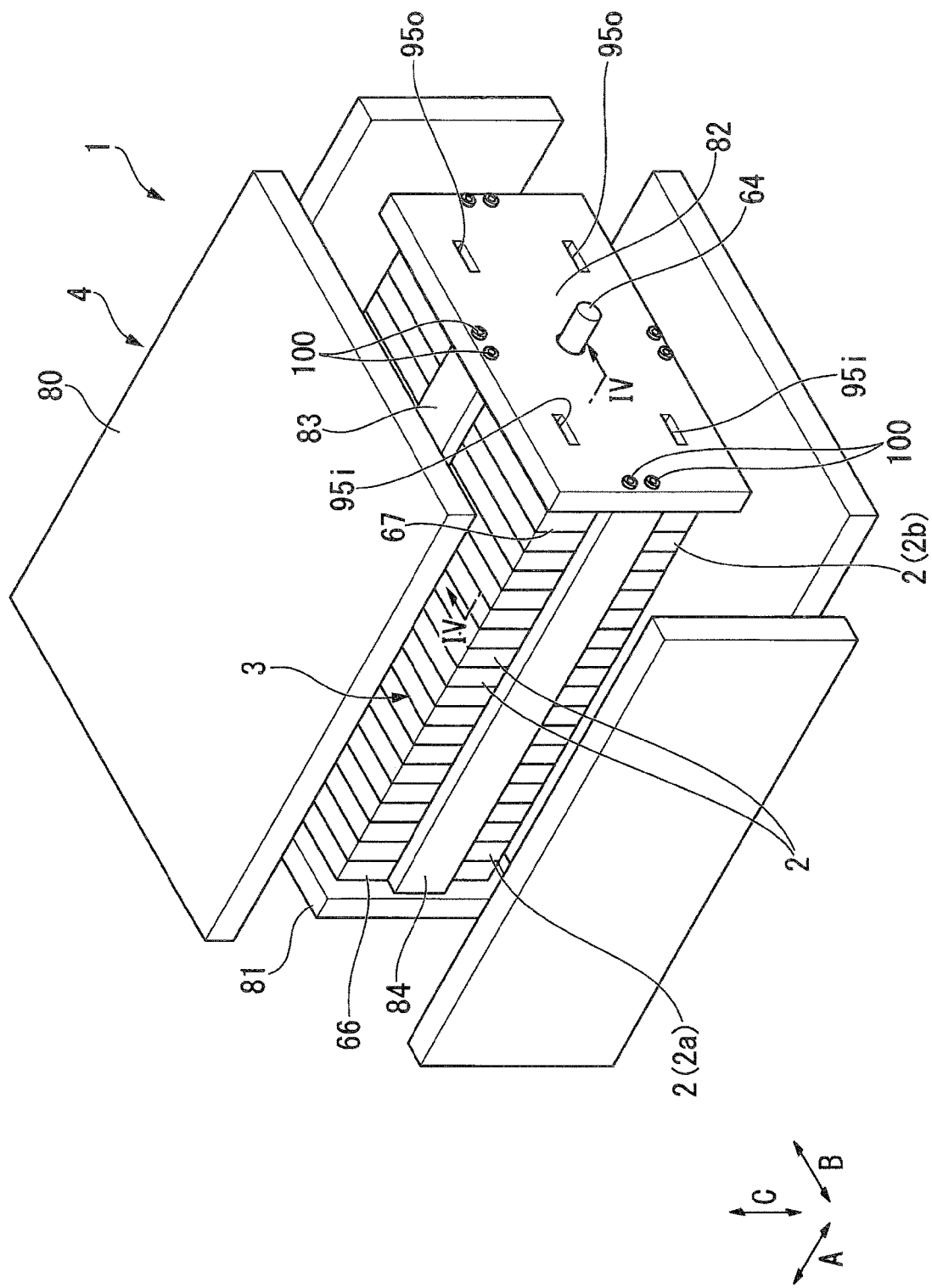
FIG. 5 is an exploded perspective view of the fuel cell stack of the embodiment as seen from the side of a second end plate.

FIG. 4 is a cross-sectional view taken along lines IV-IV of FIG. 5.

As shown in FIG. 4, a second terminal plate 62 is provided on the other side of the cell stack 3 in the A-direction. The second terminal plate 62 is electrically connected through a second separator 22 to the cathode electrode 33 of a unit cell (hereinafter referred to as a second end cell 2b) situated on the other side of each unit cell 2 in the A-direction. The second terminal plate 62 is provided with an output terminal 64 (see FIG. 5) which protrudes toward the outside of the A-direction.

A second insulator 67 is allocated on the outside of the second terminal plate 62 in the A-direction. The outer shape of the second insulator 67 in the front view is made larger than the second terminal plate 62. Further, the second insulator 67 is made thicker than the second terminal plate 62 in the A-direction.

The second insulator 67 is provided in the center with a housing portion 73 which has a depression toward the outside of the A-direction. Housed within the housing portion 73 is the second terminal plate 62 stated above.

The outer peripheral portion (a portion situated outside the housing portion 73) of the second insulator 67 is in close contact with the second separator 22 (the covering member 36) in the second end cell 2b from the outside of the A-direction. Further, formed on the peripheral portion of the second insulator 67 are a coolant inlet connecting hole 74 and a coolant outlet connecting hole (not shown) adapted to communicate separately with each coolant communicating hole 43i, 43o stated above.

<Casing>

As shown in FIG. 1, a casing 4 is formed into a box shape which is a size larger than the cell stack 3. The casing 4 houses the cell stack 3 therein. Specifically, the casing 4 is provided with a first end plate 81 and a second end plate 82 adapted to hold the cell stack 3 from both sides in the A-direction, a first connecting bar 83 and a second connecting bar 84 which connect separately the sides of the end plates 81, 82 facing in the A-direction, and four (4) side panels 80 surrounding the periphery of the cell stack 3.

As shown in FIGS. 3 and 4, the end plates 81, 82 are formed into a rectangular shape in such a manner that its outer shape in the front view is larger than the unit cell 2. As shown in FIG. 3, the first end plate 81 is allocated on one side of the cell stack 3 in the A-direction in a condition in which the first terminal plate 61 and the first insulator 66 are held between the cell stack 3 and the first end plate.

As shown in FIG. 1, each corner section of the first end plate 81 is provided with a gas inlet hole (an oxidant gas inlet hole 85i and a fuel gas inlet hole 86i) and a gas outlet hole (an oxidant gas outlet hole 85o and a fuel gas outlet hole 86o). The gas inlet holes 85i, 86i communicate with the gas inlet communicating holes 41i, 42i respectively through each corresponding gas inlet connecting hole (e.g., an oxidant gas inlet connecting hole 72) of the first insulator 66. Meanwhile, the gas outlet holes 85o, 86o communicate with the gas outlet communicating holes 41o, 42o respectively through each corresponding gas outlet connecting hole of the first insulator 66.

As shown in FIG. 4, the second end plate 82 is allocated on the other side of the cell stack 3 in the A-direction in a condition in which the second terminal plate 62 and the second insulator 67 are held between the second end plate and the cell stack 3.

FIG. 5 is an exploded perspective view of a fuel cell stack 1 as seen from the side of the second end plate 82.

As shown in FIG. 5, the second end plate 82 is provided with a pair of coolant inlet holes 95*i* and a pair of coolant outlet holes 95*o*. The coolant inlet hole 95*i* communicates with the coolant inlet communicating hole 43*i* through the corresponding coolant inlet connecting hole 74 (see FIG. 4) of the second insulator 67. Meanwhile, the coolant outlet hole 95*o* communicates with the coolant outlet communicating hole 43*o* through the corresponding coolant outlet connecting hole of the second insulator 67.

As shown in FIG. 1, the first connecting bar 83 and the second connecting bar 84 are formed into a plate shape which extends along the A-direction. It is to be noted that the cross sectional shape of each connecting bar 83, 84 may be suitably changed to a rectangular shape, a circular shape or the like.

Each connecting bar 83, 84 is respectively fastened to the end plate 81, 82 by a pair of fastening members 100 in a condition in which both end faces in the A-direction are caused to abut against the inner end faces of each end plate 81, 82 in the A-direction. Specifically, the first connecting bar 83 connects long side portions of each end plate 81, 82 on both sides of the cell stack 3 in the C-direction. Meanwhile, the connecting bar 84 connects short side portions of each end plate 81, 82 on both sides of the cell stack 3 in the B-direction. It is to be noted that three or more fastening members 100 may be provided for each connecting bar 83, 84.

Each side panel 80 is allocated on the periphery (outside of the B-direction and outside of the C-direction) of the cell stack 3. Each side panel 80 surrounds the cell stack 3, the terminal plates 61, 62, the insulator 66, 67, end plate 81, 82 and the connecting bar 83, 84 from the outside of the B-direction and from the outside in the C-direction.

Next, a fastening mechanism of each endplate 81, 82 and each connecting bar 83, 84 will now be described in detail. However, the fastening mechanism of each endplate 81, 82 and each connecting bar 83, 84 has almost the same composition. Accordingly, in the following description, the fastening mechanism of the first end plate 81 and the first connecting bar 83 will be mainly described and the description of the fastening mechanism of other parts is omitted.

Figure 6:
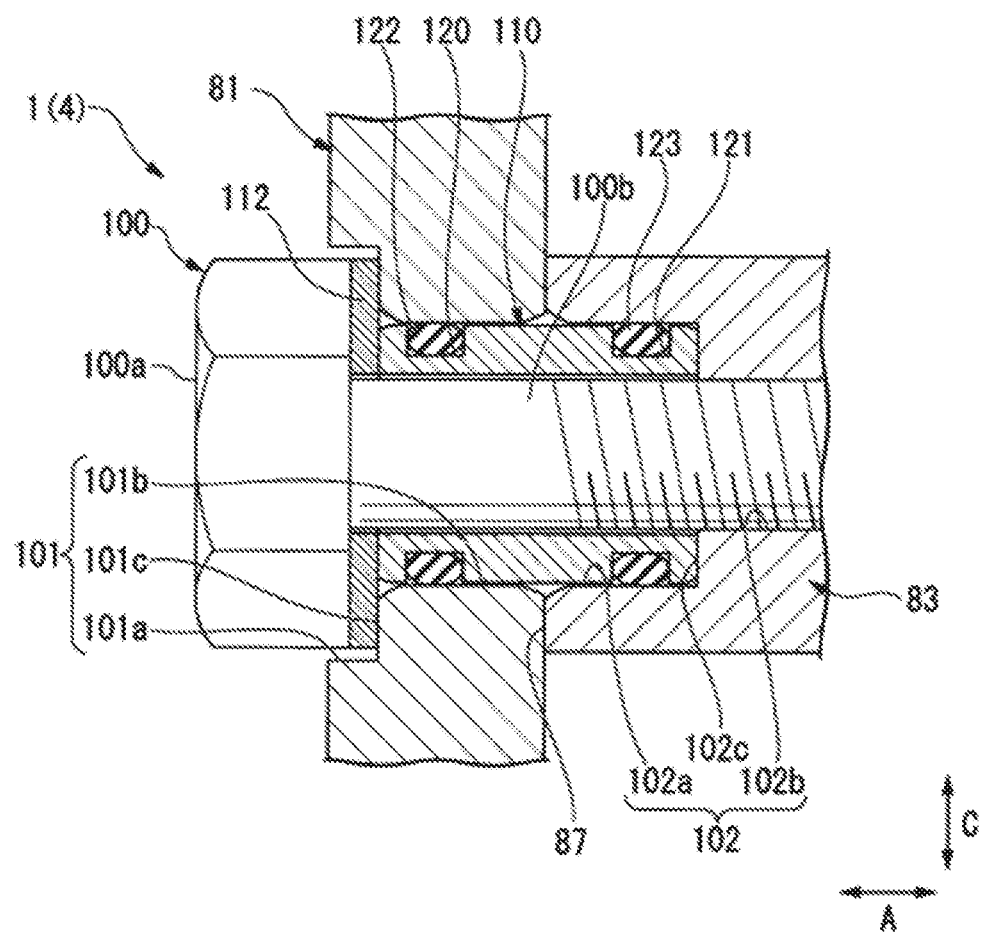
FIG. 6 is a cross-sectional view taken along lines VI-VI of FIG. 1.

FIG. 6 is a cross sectional view taken along lines VI-VI.

As shown in FIG. 6, a portion of the first end plate 81 overlapping with the first connecting bar 83 as seen from the A-direction is formed with the end plate installing hole 101. Similarly, a portion of the first end plate 81 overlapping with the second connecting bar 84 as seen from the A-direction is formed with the end plate installing hole 101, a portion of the second end plate 82 overlapping with the first connecting bar 83 as seen from the A-direction is formed with the end plate installing hole 101, and a portion of the second end plate 82 overlapping with the second connecting bar 84 as seen from the A-direction is formed with the end plate installing hole 101. The end plate installing hole 101 is a circular penetration hole which penetrates through the first end plate 81 in the A-direction. The end plate installing hole 101 is formed into a multi-stage shape of which the inner diameter is made smaller toward the inside of the A-direction. Specifically, the end plate installing hole 101 is provided with an end plate large-diameter portion 101*a* which is located on the outside of the A-direction and an end plate small-diameter portion 101*b* which continues to the inside of the A-direction relative to the end plate large-diameter portion 101*a*. In the present embodiment, two end plate installing holes 101 are formed at intervals in the B-direction.

The length of the end plate large-diameter portion 101*a* in the A-direction is shorter than that of the endplate small-diameter portion 101*b*. Further, both opening edges of the A-direction of at least the end plate small-diameter portion 101*b*, of an opening edge of the end plate installing hole 101 are chamfered. In this case, the shape of chamfering can be R chamfering or C chamfering.

A connecting bar installing hole 102 is formed on a portion of the first connecting bar 83 which is aligned with the end plate installing hole 101 as seen from the A-direction. The connecting bar installing hole 102 extends in the A-direction and opens on the outer end face 87 of the first connecting bar 83 in the A-direction. The outer opening portion of the connecting bar installing hole 102 in the A-direction communicates with the end plate installing hole 101.

The connecting bar installing hole 102 is formed into a multi-stage shape of which the inner diameter is made smaller toward the inside of the A-direction. Specifically, the connecting bar installing hole 102 is provided with the connecting bar large-diameter portion 102*a* which is located on the outside of the A-direction and the connecting bar small-diameter portion 102*b* which continues to the inside of the connecting bar large-diameter portion 102*a* in the A-direction.

The inner diameter of the connecting bar large-diameter portion 102*a* is made equal to that of the end plate small-diameter portion 101*b*.

At least the connecting bar small-diameter portion 102*b* of the connecting bar installing hole 102 is provided with a female screw hole. In addition, an outer opening edge of the A-direction of at least the connecting bar large-diameter portion 102*a* of the connecting bar installing hole 102, is chamfered. In this case, the shape of chamfering can be R chamfering or C chamfering.

Inserted into each installing hole 101, 102 is a cylindrical knock 110. The cylindrical knock 110 is used to determine a relative position between the first end plate 81 and the first connecting bar 83 and is subjected to a shearing load working between the first end plate 81 and the first connecting bar 83. The cylindrical knock 110 is formed into a cylindrical shape which extends in the A-direction.

The cylindrical knock 110 is allocated at the boundary of the end plate small-diameter portion 101*b* and the connecting bar large-diameter portion 102*a*. In this embodiment, the length of the cylindrical knock 110 in the A-direction is made equal to the total length of the end plate small-diameter portion 101*b* and the connecting bar large-diameter portion 102*a* in the A-direction. The inner end face of the cylindrical knock 110 in the A-direction is caused to abut on the connecting bar connecting surface 102*c* of the connecting bar large-diameter portion 102*a* with the connecting bar small-diameter portion 102*b* from the outside of the A-direction. Meanwhile, an outer end face of the cylindrical knock 110 in the A-direction is situated at a position equivalent to the end plate connecting surface 101*c* of the end plate large-diameter portion 101*a* with the end plate small-diameter portion 101*b*. It is to be noted that the length of the cylindrical knock 110 in the A-direction can be suitably changed if it is the total length of the end plate small-diameter portion 101*b* and the connecting bar large-diameter portion 102*a* in the A-direction or less.

Further, the outer diameter of the cylindrical knock 110 is made smaller than the inner diameter of the end plate small-diameter portion 101b and the connecting bar large-diameter portion 102a. Still further, the inner diameter of the cylindrical knock 110 is made larger than that of the connecting bar small-diameter portion 102b.

Formed at intervals in the A-direction on the outer circumference surface of the cylindrical knock 110 are two housing grooves 120, 121. Each housing groove 120, 121 has a depression on the inside of the radial direction of the cylindrical knock 110 and is formed over the entire circumference of the cylindrical knock 110. The outer housing groove 120 of each housing groove 120, 121 situated on the outside of the A-direction is formed at a portion of the cylindrical knock 110 situated within the end plate small-diameter portion 101b, while the inner housing groove 121 of each housing groove 120, 121 situated on the inside of the A-direction is formed at a portion of the cylindrical knock 110 situated within the connecting bar large-diameter portion 102a.

A seal member 122, 123 is respectively housed within each housing groove 120, 121. The seal members 122, 123 are respectively composed of an elastically deformable material (e.g., O-ring etc.). The seal member 122, 123 is formed in a ring shape in its axial direction (the A-direction). In an example of the figure, the seal member 122, 123 is formed into a circular shape in its cross-sectional in the A-direction, but it is not limited to this shape. The seal member may be formed into a rectangular shape or the like.

The seal member 122, 123 is respectively housed within each housing groove 120, 121 in a compressively deformed (elastically deformed) condition in the radial direction (in a direction perpendicular to the A-direction). In this case, the outer seal member (a first seal member) 122 situated on the outside of the A-direction (one end face of the cylindrical knock 110 in its axial direction) of the seal members 122, 123 is in close contact with the inner surface of the outer housing groove 120 and on the inner circumferential surface of the end plate small-diameter portion in a condition in which it is housed within the outer housing groove 120. Meanwhile, the inner seal member (a second seal member) 123 situated on the inside of the A-direction (another end face of the cylindrical knock 110 in its axial direction) of the seal members 122, 123 is in close contact with the inner surface of the inner housing groove 121 and the inner circumferential surface of the connecting bar large-diameter portion 102a, in a condition in which it is housed within the inner housing groove 121.

A fastening member 100 is screwed into the connecting bar installing hole 102 through the end plate installing hole 101. Specifically, a head portion 100a of the fastening member 100 abuts on the end plate connecting surface 101c from the outside of the A-direction through a washer 112. In this case, the washer 112 and a part of the head portion 100a are housed within the end plate large-diameter portion 101a. With this arrangement, a protrusion amount of the head portion 100a to the outside of the A-direction from the first end plate 81 is suppressed. For example, a hexagon head bolt is preferably used as the fastening member 100 of the present embodiment. However, the fastening member 100 is not limited to the hexagon head bolt, but it may be a hexagon socket bolt or the like.

The outer diameter of a shaft part 100b of the fastening member 100 is made smaller than the inner diameter of the cylindrical knock 110. The shaft part 100b penetrates through the cylindrical knock 110 within each installing hole 101, 102. A tip end portion of the shaft part 100b is screwed to the inside of the connecting bar small-diameter portion 102b.

As seen from the above, in the present embodiment, the outer seal member 122 is closely contacted on the inner face of the outer housing groove 120 and the inner circumferential surface of the end plate small-diameter portion 101b in the elastically deformed condition. With this arrangement, it is possible to prevent the reaction gas entering the installing holes 101, 102 from flowing to the outside of the A-direction through the outer circumferential side of the cylindrical knock 110 by the outer seal member 122.

Further, in this embodiment, the inner seal member 123 is closely contacted on the inner face of the inner housing groove 121 and the inner circumferential surface of the connecting bar large-diameter portion 102a in the elastically deformed condition. With this arrangement, it is possible to prevent the reaction gas entering the installing holes 101, 102 from entering the inner circumferential side of the cylindrical knock 110 from the inside of the A-direction in the cylindrical knock 110 by the inner seal member 123.

Thus, it is possible to secure sealing performance between the installing hole 101, 102 and the fastening member 100 and to prevent the reaction gas from being released from the installing holes 101, 102 to the outside of the casing 4 by the seal members 122, 123.

[Manufacturing Method of Fuel Cell Stack]

Figure 7:
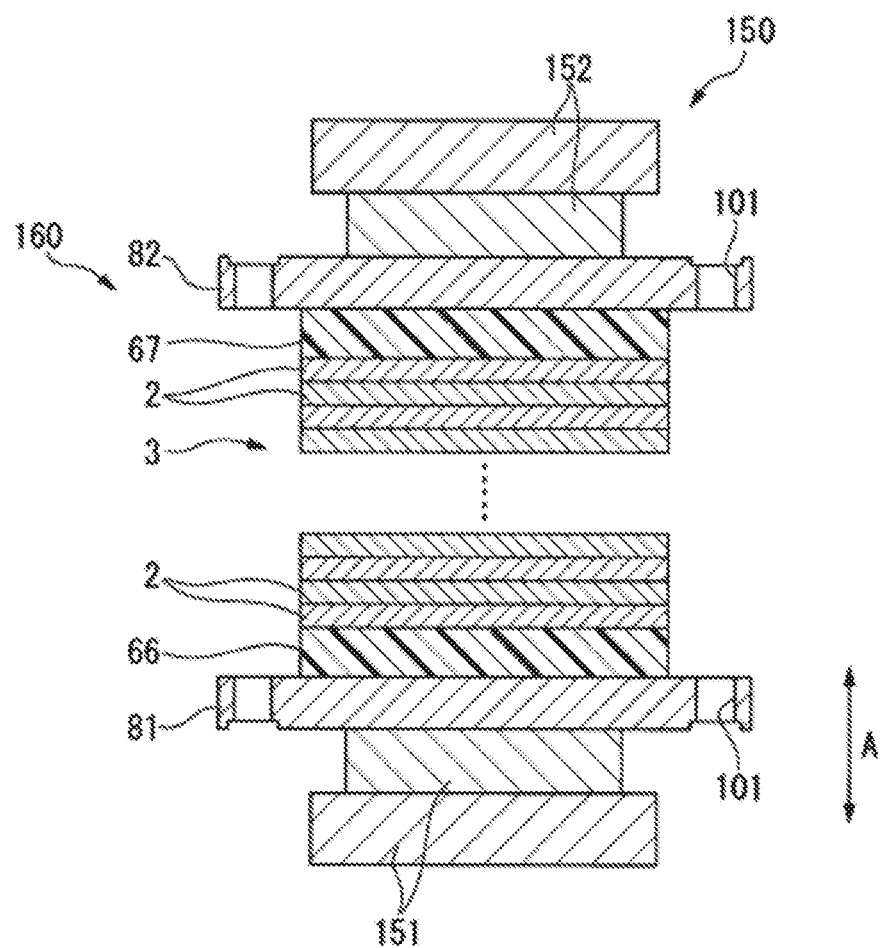
FIG. 7 is a process drawing for explaining a manufacturing method (a stacking process) of the fuel cell stack.

Next, a manufacturing method of the fuel stack 1 stated above will be described. FIG. 7 is a process drawing for explaining a manufacturing method (a stacking step S1) of a fuel stack 1.

First, a stacking machine 150 used for manufacturing the fuel stack 1 will be described. In the following description, the A-direction stated above is described as a vertical direction.

As shown in FIG. 7, a stacking machine 150 is provided with a base member 151 and a pushing member 152 located above the base member 151 to face it in the A-direction. The pushing member 152 is made movable by a driving mechanism (not shown) to the A-direction relative to the base member 151.

Figure 8:
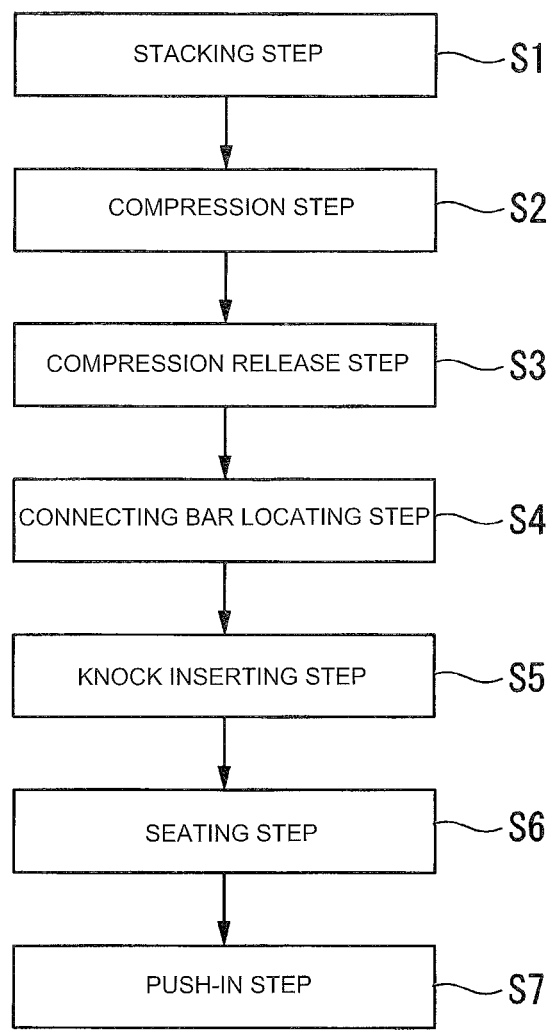
FIG. 8 is a flow chart for explaining the manufacturing method of the fuel cell stack.

FIG. 8 is a flow chart for explaining a manufacturing method of a fuel stack 1.

As shown in FIG. 8, a manufacturing method of a fuel stack 1 according to the present embodiment mainly comprises a stacking step S1, a compression step S2, a compression release step S3, a connecting bar locating step S4, a knock inserting step S5, a seating step S6, and a push-in step S7.

In the stacking step S1 as shown in FIG. 7, sequentially stacked on the base member 151 in the A-direction are a first end plate 81, a first insulator 66, a first terminal plate 61 (see FIG. 3), a cell stack 3 (a plurality of unit cells 2), a second terminal plate 62 (see FIG. 4), a second insulator 67 and a second end plate 82. It is to be noted that a stack of the first end plate 81, the first insulator 66, the first terminal plate 61, the cell stack 3, the second terminal plate 62, the second insulator 67, and the second end plate 82 is hereinafter simply referred to as a stack 160. Further, in this embodiment, a method in which a stacking step S1 is performed by allocating the first end plate 81 on the base member 151 will be described for the sake of convenience, but the stacking step S1 may be performed by allocating the second end plate 82 on the base member 151.

Figure 9:
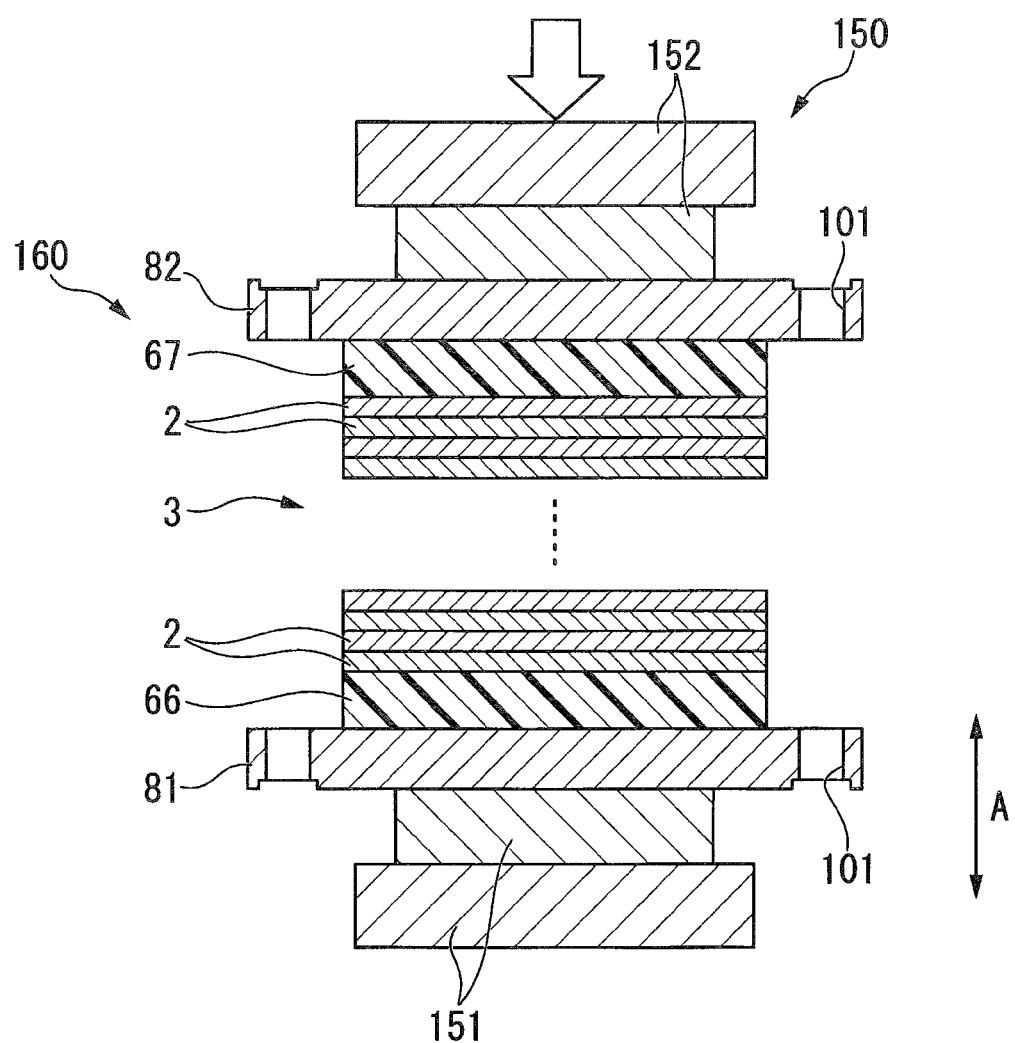
FIG. 9 is a process drawing for explaining the manufacturing method (a compression process) of the fuel cell stack.

FIG. 9 is a process drawing for explaining a manufacturing method (a compression step S2) of a fuel stack 1.

In the compression step S2 as shown in FIG. 9, the pushing member 152 is lowered to compress the stack 160 between the base member 151 and the pushing member 152 in the A-direction. In this case, the pushing member 152 is lowered until the length of the cell stack 3 in the A-direction reaches the predetermined stacking length (For example, the length equivalent to the cell stack 3 of a fuel cell stack 1 stated above).

In the compression release step S3, the pushing member 152 is raised to release a compression load applied on the stack 160 from the stacking machine 150. Then, the first end plate 81 of the stack 160 is pushed up in the A-direction by the restoring force of the unit cell 2 and the like. With this, a distance in the A-direction between the first endplate 81 and the second end plate 82 expands more than that in the compression step S2.

Figure 10:
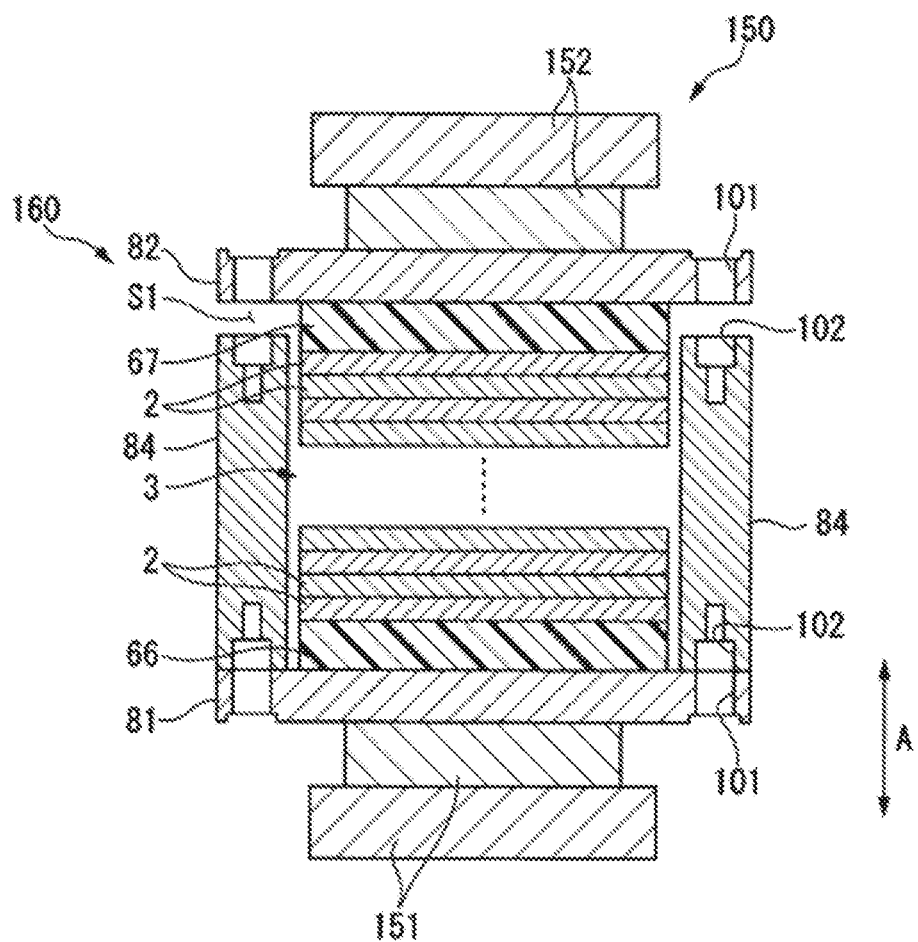
FIG. 10 is a process drawing for explaining the manufacturing method (a connecting bar locating process) of the fuel cell stack.

FIG. 10 is a process drawing for explaining a manufacturing method (a connecting bar locating step S4) of a fuel cell stack 1.

In the connecting bar locating step S4 as shown in FIG. 10, the connecting bars 83, 84 are allocated d between the first end plate 81 and the second end plate 82. The second connecting bars 84 are shown in FIGS. 10-17, and the first connecting bars 83 provided in the same manner as the second connecting bars 84 shown in FIGS. 10-17. Specifically, each connecting bar 83, 84 is located on the first end plate 81 in a condition in which corresponding end plate installing hole 101 and the connecting bar installing hole 102 are positioned. In this case, a clearance S1 is formed in the A-direction between the second end plate 82 and the first connecting bar 83, and between the second end plate 82 and the second connecting bar 84.

Figure 11:
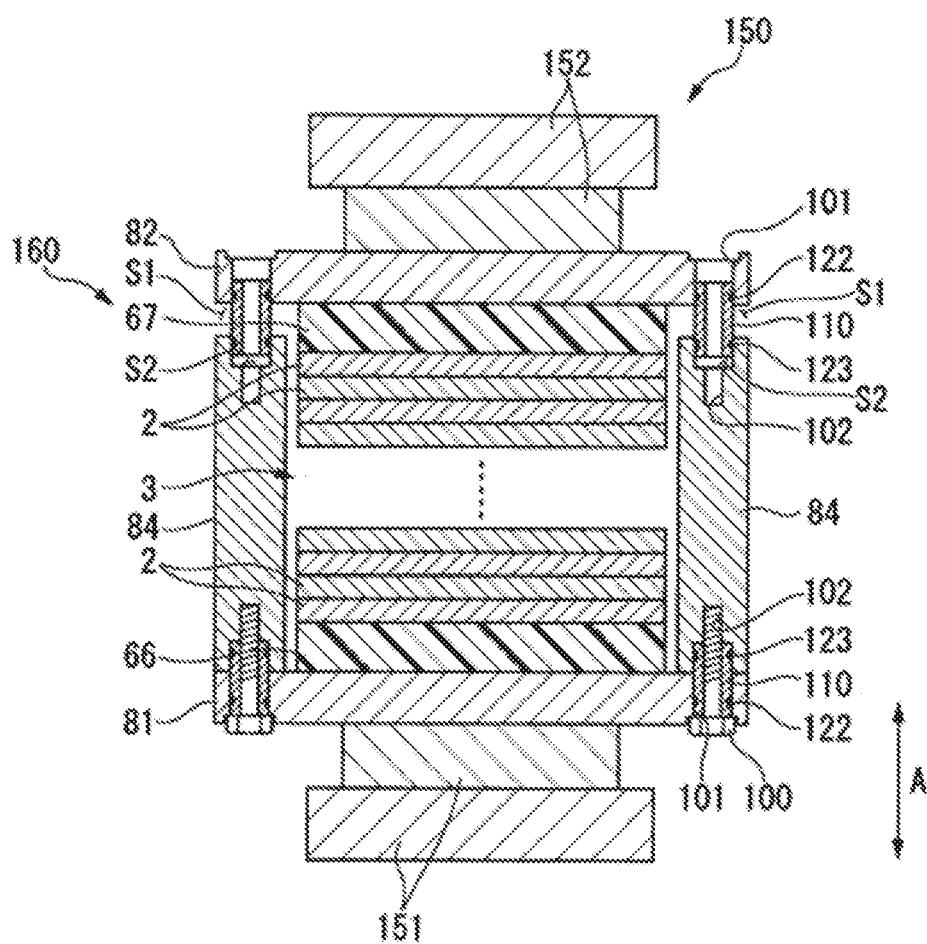
FIG. 11 is a process drawing for explaining the manufacturing method (a knock inserting process) of the fuel cell stack.

FIG. 11 is a process drawing for explaining a manufacturing method (a knock inserting step S5) of a fuel cell stack 1.

Figure 12:
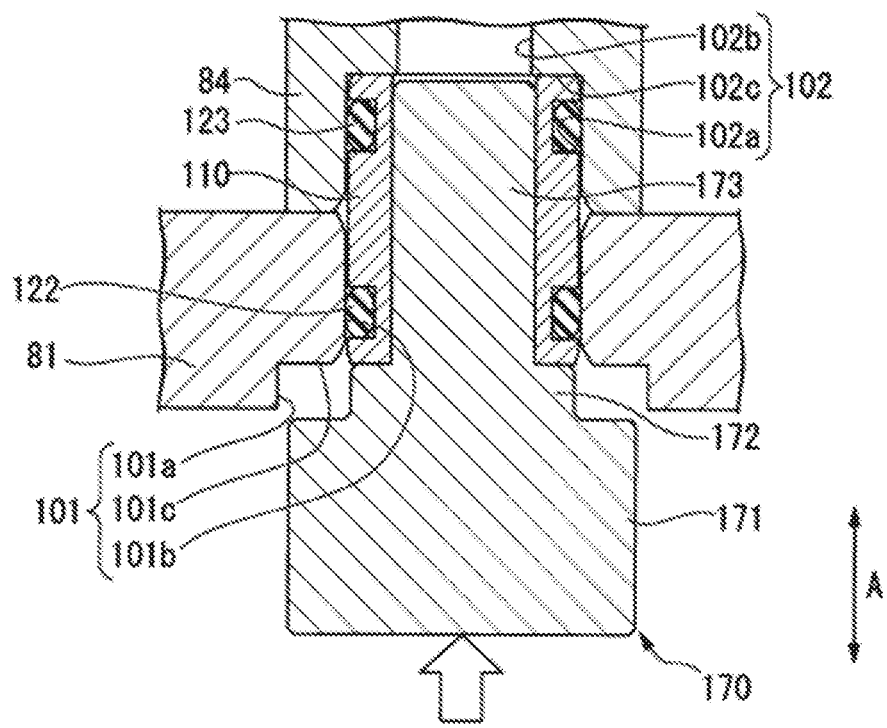
FIG. 12 is a process drawing for explaining the manufacturing method (a first knock inserting process) of the fuel cell stack.

In the knock inserting step S5 as shown in FIG. 11, the cylindrical knock 110 is inserted within the end plate installing hole 101 and the connecting bar installing hole 102 using a push-in jig 170 (see FIG. 12).

FIG. 12 is a process drawing for explaining a manufacturing method (a first knock inserting step) of a fuel cell stack 1.

As shown in FIG. 12, the push-in jig 170 is formed into a multi-stage columnar shape of which the outer diameter is made smaller toward its tip end portion. Specifically, the push-in jig 170 is continuously provided, from a base end portion to a tip end portion, with a plate abutting portion 171, a knock push-in portion 172, and a knock inserting portion 173.

The plate abutting portion 171 is formed in such a manner that its outer diameter is made smaller than the inner diameter of the end plate large-diameter portion 101*a* and made larger than the inner diameter of the end plate small-diameter portion 101*b*. In other words, the plate abutting portion 171 can not only enter the endplate large-diameter portion 101*a*, but also abut on the end plate connecting surface 101*c* in the A-direction.

The knock push-in portion 172 is provided in such a manner that its outer diameter is made smaller than the inner diameter of the end plate small-diameter portion 101*b* and made larger than the inner diameter of the cylindrical knock 110. In other words, the knock push-in portion 171 can not only enter the end plate small-diameter portion 101*b*, but also abut on the cylindrical knock 110 in the A-direction.

The knock inserting portion 173 is provided in such a manner that its outer diameter is made smaller than the inner diameter of the cylindrical knock 110. Namely, the knock inserting portion 173 is provided to be capable of entering the cylindrical knock 110. It is to be noted that a structure of the push-in jig 170 can be suitably modified. For example, the push-in jig 170 can also be made not to have the knock inserting portion 173.

The knock inserting step S5 of the present embodiment comprises a first knock inserting step and a second knock inserting step.

In the first knock inserting step, the cylindrical knock 110 to which the seal members 122, 123 are attached is inserted within the end plate installing hole 101 of the first end plate 81 and the connecting bar installing hole 102. Specifically, first, the knock inserting portion 173 of the push-in jig 170 is inserted within the cylindrical knock 110. Next, the cylindrical knock 110 and the push-in jig 170 (the knock inserting portion 173) are inserted together within the end plate installing hole 101 and the connecting bar installing hole 102 through the end plate installing hole 101 of the first endplate 81. At this time, since the cylindrical knock 110 is pushed in by the knock push-in portion 172, the seal members 122, 123 enter the endplate installing hole 101 and the connecting bar installing hole 102 while being in slide-contact with the inner circumferential surface of the end plate installing hole 101 and the connecting bar installing hole 102. Afterwards, the inner end face of the cylindrical knock 110 in the A-direction abuts on the connecting bar connecting surface 102*c* in the A-direction, wherein the first knock inserting step is completed. After the completion of the first knock inserting step, the push-in jig 170 is taken out of the holes. Further, as shown in FIG. 11, after the completion of the first knock inserting step, a fastening member 100 is inserted into the cylindrical knock 110 to fasten the first end plate 81 and the first connecting bar 83, then the first end plate 81 and the second connecting bar 84, respectively.

Figure 13:
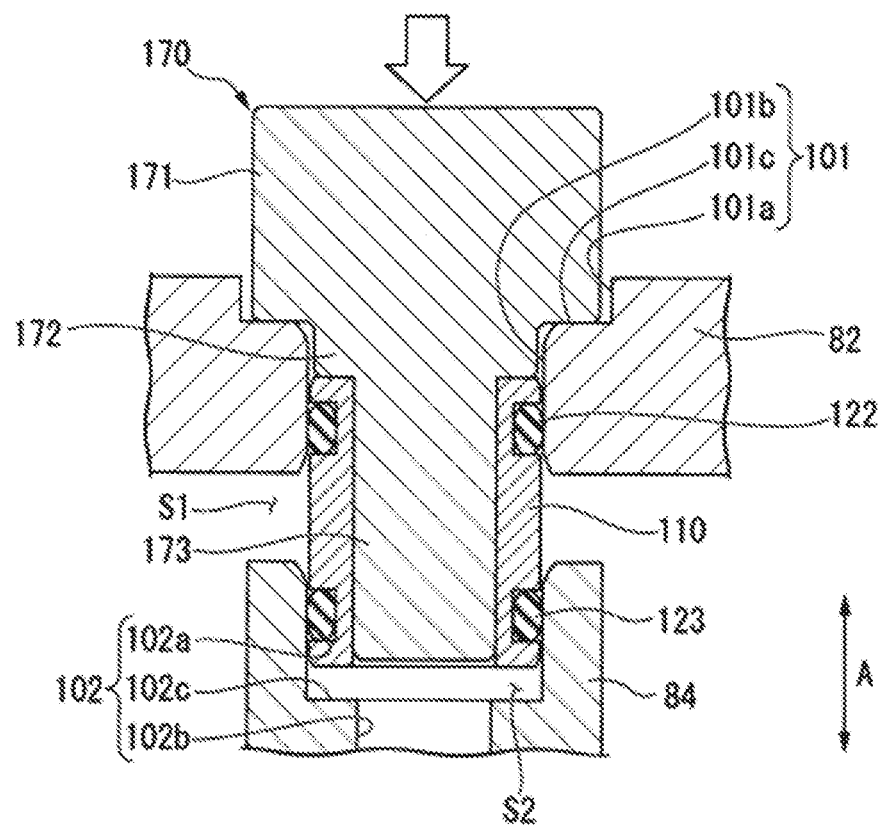
FIG. 13 is a process drawing for explaining the manufacturing method (a second knock inserting process) of the fuel cell stack.

FIG. 13 is a process drawing for explaining a manufacturing method (a second knock inserting step) of a fuel cell stack 1.

As shown in FIG. 13, in the second knock inserting step, as in the first knock inserting step, the knock inserting portion 173 of the push-in jig 170 is inserted into the cylindrical knock 110. Then, the cylindrical knock 110 and the push-in jig 170 (knock inserting portion 173) are inserted together into the end plate installing hole 101 and the connecting bar installing hole 102 through the end plate installing hole 101 of the second end plate 82. At this time, the cylindrical knock 110 is pushed in by the knock push-in portion 172 until the plate abutting portion 171 of the push-in jig 170 abuts against the end plate connecting surface 101*c* in the A-direction. The cylindrical knock 110 is located in such a manner that the inner seal member 123 of the seal members 122, 123 attached to the cylindrical knock 110 is situated in the connecting bar large-diameter portion 102*a* and the outer seal member 122 is situated within the endplate small-diameter portion 101*b*. Further, the cylindrical knock 110 is located within the end plate installing hole 101 and the connecting bar installing hole 102 in such a manner that a clearance S2 is made in the A-direction between the inner end face of the cylindrical knock 110 in the A-direction and the connecting bar connecting surface 102*c*. In this case, the inner end face of the cylindrical knock 110 in the A-direction may abut against the connecting bar connecting surface 102*c* in the A-direction (without any clearance S2).

Figure 14:
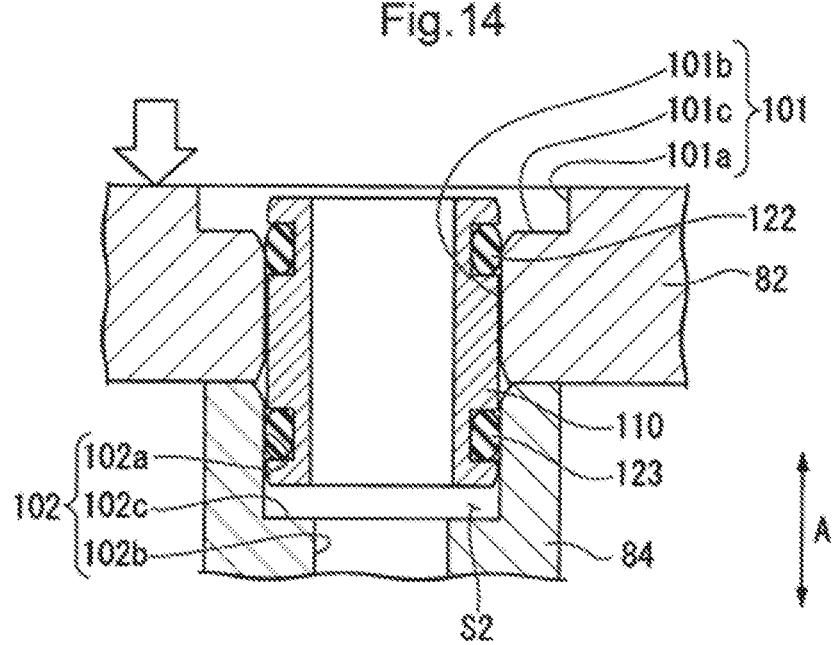
FIG. 14 is a process drawing for explaining the manufacturing method (a seating process) of the fuel cell stack.

FIG. 14 is a process drawing for explaining a manufacturing method (a seating step S6) of a fuel cell stack 1.

In the seating step S6 as shown in FIG. 14, as in the compression step S2 stated above, the pushing member 152 (see FIG. 9) is lowered to allow the second endplate 82 to contact the connecting bars 83, 84 in the A-direction. At this time, the second end plate descends to the cylindrical knock 110 while the inner circumferential surface of the end plate small-diameter portion 101*b* is being in slid-contact with the outer seal member 122.

Figure 15:
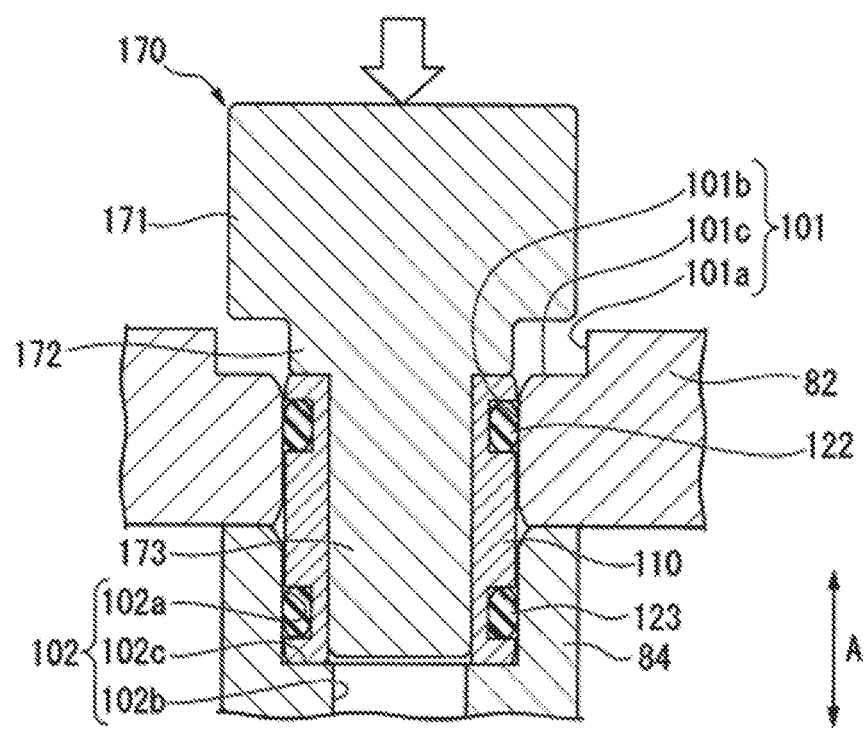
FIG. 15 is a process drawing for explaining the manufacturing method (a push-in process) of the fuel cell stack.

FIG. 15 is a process drawing for explaining a manufacturing method (a push-in step S7) of a fuel cell stack 1.

In the push-in step S7 as shown in FIG. 15, the cylindrical knock 110 allocated in the second knock inserting step is pushed in using the push-in jig 170 stated above until the inner end face of the A-direction abuts on the connecting bar connecting surface 102*c*.

Figure 16:
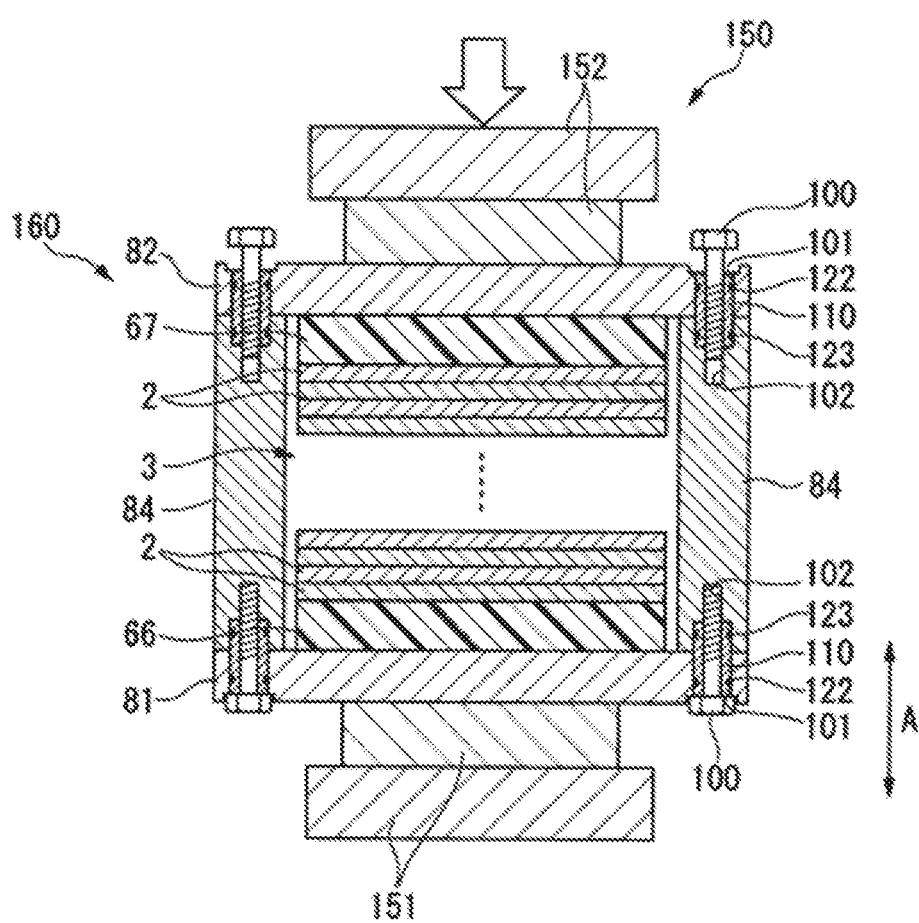
FIG. 16 is a process drawing for explaining the manufacturing method of the fuel cell stack.

FIG. 16 is a process drawing for explaining a manufacturing method of a fuel cell stack 1.

As shown in FIG. 16, after the push-in step S7, the second end plate 82 and the connecting bars 83, 84 are fastened. Specifically, the fastening member 100 is inserted into the cylindrical knock 110 to fasten the second end plate 82 and the first connecting bar 83, and the second endplate 82 and the second connecting bar 84, respectively. In this case, fastening of the first end plate 81 and each connecting bar 83, 84 may also be performed after the push-in step S7.

Next, a compression load applied to the stack 160 from the stacking machine 150 is released. Afterwards, the fuel cell stack 1 stated above is completed by incorporating a side panel 80 into the stack 160.

As seen from the above, in the knock inserting step S5 according to the present embodiment, the cylindrical knock 110 is provided in such a manner that the outer seal member 122 is situated within the end plate installing hole 101, while the inner seal member 123 is situated within the connecting bar installing hole 102.

Figure 17:
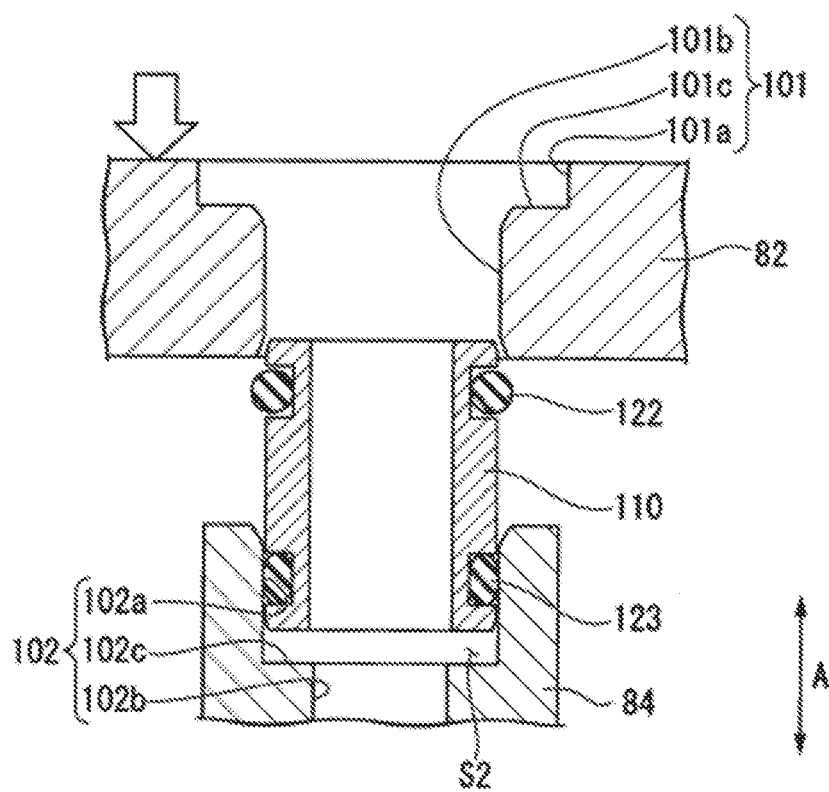
FIG. 17 is a process drawing for explaining a comparative example of the seating process corresponding to FIG. 14.

According to this structure, in the knock inserting step S5, the outer seal member 122 is located in advance within the endplate installing hole 101 in the compressively deformed condition, while the inner seal member 123 is located in advance within the connecting bar installing hole 102 in the compressively deformed condition. With this, in the seating step S6, in the case where the second end plate 82 is caused to abut against the connecting bars 83, 84 using the stacking machine 150, for example, as shown in FIG. 17, it is possible to prevent an open edge of the end plate installing hole 101 from contacting the outer seal member 122 each other. Therefore, it is possible to prevent the outer seal member 122 from getting struck in the end plate installing hole 101. As a result, it is possible not only to suppress the damage of the seal members 122, 123, but also to locate these at a desired position. With this arrangement, leakage of reaction gas to the outside of the casing 4 stated above and water entry from the outside of the casing 4 can be suppressed for a long period of time.

In the knock inserting step S5 according to the present embodiment, the cylindrical knock 110 is pushed into the end plate installing hole 101 and the connecting bar installing hole 102 until the plate abutting portion 171 abuts against the end plate connecting surface 101*c*.

According to this composition, a position of the cylindrical knock 110 in the A-direction relative to the installing holes 101, 102 in the knock inserting step S5 can be determined depending upon the protrusion amount of the knock push-in portion 172 from the plate abutting portion 171. With this, in the knock inserting step S5, it is possible to easily locate the cylindrical knock 110 and each seal member 122, 123 at a desired position only by pushing the push-in jig 170 to a position in which the plate abutting portion 171 abuts against the end plate connecting surface 101*c*.

In the present embodiment, in the knock inserting step S5, the cylindrical knock 110 is allocated to provide a clearance S2 between the inner end face of the cylindrical knock 110 in the A-direction and the connecting bar connecting surface 102*c*.

According to this structure, even if a clearance between each seal member 122, 123 in the A-direction is shorter than that between the connecting bar connecting surface 102*c* and the inner end face of the second end plate 82 in the A-direction, in the knock inserting step S5, the outer seal member 122 can be located within the end plate installing hole 101, while the inner seal member 123 can be located within the connecting bar installing hole 102. With this arrangement, it is possible to prevent the seal members 122, 123 from coming off from each installing hole 101, 102 from the knock inserting step S5 to the seating step S6.

Meanwhile, even if the clearance between each seal member 122, 123 in the A-direction is reduced, the seal members 122, 123 can be allocated within the corresponding installing holes 101, 102 and the length of the cylindrical knock 110 in the A-direction can be reduced. With this, it is possible to reduce material cost of the cylindrical knock 110 and the machining cost of the installing holes 101, 102 and the like.

It is to be noted that the technical scope of the present invention is not limited to each embodiment stated above and includes various modifications made to the embodiment without departing from the technical subjects of the present invention. In other words, the structure shown in the above embodiment is merely one example and can be suitably modified.

For example, in the above-mentioned embodiment, two seal members are used, but three or more seal members may be used. Even in this case, it is preferable that each seal member is allocated within the installing holes 101, 102 in the knock inserting step.

In the embodiment stated above, the head portion 100*a* of the fastening member 100 is housed within the endplate large-diameter portion 101*a*, but it is not limited to this structure. In other words, the head portion 100*a* may be formed to abut on the outer end face of the end plates 81, 82 in the A-direction.

In the above-mentioned embodiment, the plate abutting portion 171 of the push-in jig 170 is formed to abut on the end plate connecting surface 101*c*, but it is not limited to this structure. In other words, the plate abutting portion 171 may be formed to abut on the outer end face of the end plates 81, 82 in the A-direction.

In the embodiment stated above, the installing holes 101, 102 are formed into a multi-stage shape. However, the installing holes are not limited to this structure, but may be formed to have the uniform diameter over the whole area.

In the embodiment stated above, the compression step S2 and the compression release step S3 are performed prior to the connecting bar allocating step S4, but the steps are not limited to this method. In other words, it may be good to advance to the connecting bar allocating step S4 after the stacking step S1.

In above-mentioned embodiment, the manufacturing method of the fuel cell stack 1 of the present invention is applied to the second knock inserting step, but it is good if the method can be applied to one of the knock inserting steps.

The components used in the above-mentioned embodiment may be suitably changed to other well-known components without departing from the technical subjects of the present invention or these modified examples may be suitably combined.

According to a first embodiment of the present invention, a manufacturing method of a fuel cell stack includes a stacking step for locating a first end plate (e.g., a first end plate 81 in a preferred embodiment) and a second end plate (e.g., a second endplate 82 in the embodiment) on both sides of a cell stack (e.g., a cell stack 3 in the embodiment) in a first direction, the cell stack being formed by stacking a plurality of fuel cells (e.g., a unit cell 2 in the embodiment) in the first direction; a connecting member locating step for locating a connecting member (e.g., connecting bars 83, 84 in the embodiment) between the first end plate and the second end plate; a knock inserting step for inserting a cylindrical knock (e.g., a cylindrical knock 110 in the embodiment) at the boundary of an endplate installing hole (e.g., an end plate installing hole 101 in the embodiment) of at least one of the first and second end plates and a connecting member installing hole (e.g., a connecting bar installing hole 102 in the embodiment); a seating step for moving the first and second end plates closer to each other in the first direction to cause the one of the plates to be abutted against the connecting member in the first direction; and a fastening step for inserting a fastening member (e.g., a fastening member 100 in the embodiment) into the cylindrical knock and fastening the one of the end plates and the connecting member in the first direction. In the knock inserting step, a first seal member is inserted around one end portion of the cylindrical knock in its axial direction, while a second seal member is inserted around another end portion of the cylindrical knock in its axial direction, and the cylindrical knock is located in such a manner that the first seal member is situated within the end plate installing hole and the second seal member is situated within the connecting member installing hole.

According to a second embodiment, in the knock inserting step, a push-in jig (e.g., a push-in jig 170 in the embodiment) is provided with a plate abutting portion (e.g., a plate abutting portion 171 in the embodiment) capable of abutting on the one of the endplates from the outside of the first direction and a knock push-in portion (e.g., a knock push-in portion 172 in the embodiment) which protrudes in the first direction from the plate abutting portion and can enter the end plate installing hole, and wherein the knock push-in portion of the push-in jig may push the cylindrical knock into the end plate installing hole and the connecting member installing hole to a position in which the plate abutting portion abuts against the one of the end plates.

According to a third embodiment, the connecting member installing hole is provided with a large-diameter portion (e.g., a connecting bar large-diameter portion 102a) which opens at the outer end face of the connecting member in the first direction and into which the cylindrical knock is inserted, a small-diameter portion (e.g., a connecting bar small-diameter portion 102b in the embodiment) which is located on the inside of the large-diameter portion in the first direction and to which the fastening member is screwed, and a connecting surface (e.g., a connecting bar connecting surface 102c in the embodiment) which connects the large-diameter portion to the small-diameter portion and extends in such a direction as to cross the first direction, and wherein in the knock inserting step, the cylindrical knock may be located in a condition in which a clearance (e.g., a clearance S2 in the embodiment) is provided in the first direction between the inner end face of the cylindrical knock in the first direction and the connecting surface.

According to the first embodiment, in the knock inserting step, the cylindrical knock is situated in advance to locate the first seal member within the endplate installing hole and the second seal member within the connecting member installing hole. With this arrangement, in the seating step, in the case where one of the end plates is caused to abut against the connecting member using, for example, a stacking machine, it is possible to suppress the contact of an opening edge of the end plate installing hole with the first seal member. Therefore, this can inhibit the first seal member from getting struck in the end plate installing hole. As a result, it is possible not only to suppress damage of the seal member, but also to locate it at a desired position. With this, it is possible to suppress the leakage of reaction gas to the outside through the installing holes and water entry from outside, for a long period of time.

According to the second embodiment, a position of the cylindrical knock in the first direction relative to the installing hole in the knock inserting step can be determined depending on a protrusion amount of the knock push-in portion from the plate abutting portion. With this arrangement, in the knock inserting step, it is possible to easily locate the cylindrical knock and each seal member at a desired position only by pushing the push-in jig into a position in which the plate abutting portion abuts against the end plate.

According to the third embodiment, even in the case where a clearance in the first direction between the first seal member and the second seal member is shorter than that between the connecting surface and a seating surface of the one of end plates with the connecting member in the first direction, in the knock inserting step, the first seal member can be situated within the end plate installing hole, while the second seal member can be situated within the connecting bar installing hole. With this arrangement, it is possible to prevent the seal member from falling out of each installing hole between the knock inserting step and the seating step.

Meanwhile, even though the clearance between each seal member in the first direction is reduced, it is possible to reduce the length of the cylindrical knock in the first direction because the seal member can be situated within the corresponding installing hole. Thus, a material cost of the cylindrical knock, a machining cost of the installing holes, etc. can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A manufacturing method of a fuel cell stack including a cell stack, comprising:
   providing the cell stack including fuel cells stacked in a stacking direction and having a first end and a second end opposite to the first end in the stacking direction;
   providing a first end plate at the first end of the cell stack, the first end plate having a first end plate through hole;
   providing a second end plate at the second end of the cell stack;
   providing a connecting member to connect the first end plate and the second end plate such that first end plate through hole is aligned with a first connecting member installing hole in the connecting member;
   inserting a first knock with a first seal and a second seal into the first end plate through hole and into the first connecting member installing hole, both of the first seal and the second seal being provided around an outer surface of the first knock, the first seal being located between the first knock and the first end plate in the first end plate through hole, the second seal being located between the first knock and the connecting member in the first connecting member installing hole;

moving the first end plate or the connecting member in the stacking direction to contact each other;

inserting a fastening member into the first knock to connect the first the end plate to the connecting member;

wherein the first knock has a first housing groove extending around an outer circumference thereof, the first seal being disposed within the first housing groove, wherein the first knock has a second housing groove extending around the outer circumference thereof, the second seal being disposed within the second housing groove, and wherein the first housing groove and the second housing groove are spaced apart from each other on the outer surface of the first knock;

wherein the first seal directly contacts the first knock and the first end plate, and wherein the second seal directly contacts the first knock and the connecting member.

2. The manufacturing method according to claim 1, wherein, in inserting the first knock, a push-in jig is provided with a plate abutting portion capable of abutting on the first end plate from an outside of the stacking direction and a knock push-in portion which protrudes in the stacking direction from the plate abutting portion and has a knock push-in portion capable of entering the first end plate through hole, and wherein the first knock is pushed into the first end plate through hole and the first connecting member installing hole by the knock push-in portion to a position in which the plate abutting portion abuts against the first end plate.

3. The manufacturing method according to claim 1, wherein the first connecting member installing hole is provided with a large-diameter portion which is open at an outer end face of the connecting member in the stacking direction and into which the first knock is inserted, a small-diameter portion which is located on an inside of the large-diameter portion in the stacking direction and to which the fastening member is screwed, and a connecting surface which connects the large-diameter portion to the small-diameter portion and extends in such a direction as to cross the stacking direction, and wherein in inserting the first knock, the first knock is located in a condition in which a clearance is provided in the stacking direction between an inner end face of the first knock in the stacking direction and the connecting surface.

4. The manufacturing method according to claim 1, wherein
the second end plate has a second end plate through hole,
the connecting member has a second connecting member installing hole, and
the manufacturing method further comprises
inserting a second knock with a third seal and a fourth seal provided around an outer surface of the second knock into the second end plate through hole and into the second connecting member installing hole, the third seal being located between the second knock and the second end plate in the second end plate through hole, the fourth seal being located between the second knock and the connecting member in the second connecting member installing hole.

5. The manufacturing method according to claim 1, wherein the first knock has a cylindrical shape.

6. The manufacturing method according to claim 4, wherein the second knock has a cylindrical shape.

7. The manufacturing method according to claim 1, wherein, when the first the end plate is connected to the connecting member by the fastening member, the first end plate and the connecting member abut against each other at a location aligned with an area where the first housing groove and the second housing groove are spaced apart from each other when viewed in a direction perpendicular to an axis of the fastening member.

\* \* \* \* \*